(12) United States Patent
Banno

(10) Patent No.: US 9,094,575 B2
(45) Date of Patent: Jul. 28, 2015

(54) NON-TRANSITORY COMPUTER-READABLE MEDIUM STORING PROGRAM AND COMMUNICATION DEVICE

(71) Applicant: Hirokazu Banno, Nagoya (JP)

(72) Inventor: Hirokazu Banno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 66 days.

(21) Appl. No.: 13/951,564

(22) Filed: Jul. 26, 2013

(65) Prior Publication Data

US 2014/0028787 A1  Jan. 30, 2014

(30) Foreign Application Priority Data

Jul. 26, 2012  (JP) .................... 2012-165399
Jun. 24, 2013  (JP) .................... 2013-132045

(51) Int. Cl.
*H04N 7/14* (2006.01)
*H04N 7/15* (2006.01)
*H04L 29/06* (2006.01)
*H04M 3/56* (2006.01)
*H04L 12/18* (2006.01)

(52) U.S. Cl.
CPC .............. *H04N 7/15* (2013.01); *H04L 12/1818* (2013.01); *H04L 65/1069* (2013.01); *H04L 65/403* (2013.01); *H04M 3/56* (2013.01); *H04M 2203/5009* (2013.01)

(58) Field of Classification Search
CPC ............. H04L 65/403; H04L 12/1818; H04M 2203/5009

USPC .......................... 348/14.08; 370/260; 709/204
See application file for complete search history.

(56) References Cited

U.S. PATENT DOCUMENTS

| 6,151,619 | A | 11/2000 | Riddle | |
|---|---|---|---|---|
| 2002/0015003 | A1* | 2/2002 | Kato et al. | ...................... 345/1.1 |
| 2011/0254837 | A1* | 10/2011 | Kang et al. | ..................... 345/419 |
| 2013/0307997 | A1* | 11/2013 | O'Keefe et al. | ............ 348/207.1 |

FOREIGN PATENT DOCUMENTS

JP  11-134225 A  5/1999

* cited by examiner

*Primary Examiner* — Creighton Smith
(74) *Attorney, Agent, or Firm* — Banner & Witcoff, Ltd.

(57) ABSTRACT

A non-transitory computer-readable medium stores computer-readable instructions that, when executed by a processor of a communication device, instruct the processor to perform processes that includes performing a first receiving that receives a start request from a partner communication device, the start request including identification information and first user information and requesting that a remote conference be started, acquiring, based on the identification information, second user information stored in a storage portion, performing a first determining that determines whether the first user information and the second user information differ from one another, performing a first outputting that outputs a first command in response to determining that the first user information and the second user information differ from one another, and performing a second outputting that outputs a second command in response to determining that the first user information and the second user information do not differ from one another.

10 Claims, 7 Drawing Sheets

| USER ID | NICKNAME | SELF-INTRODUCTION | USER'S DEPARTMENT | USER IMAGE | UPDATE DATE AND TIME | NUMBER OF CONFERENCES |
|---|---|---|---|---|---|---|
| 1 | TARO | xxxxxxxxxx | yyyyy | taro.jpg | 2012/6/1 1:23:45 | 10 |
| 2 | HANAKO | yyyyyyyyyy | zzzzz | hanako.jpg | 2012/6/2 2:34:56 | 5 |
| 3 | ICHIRO | zzzzzzzzzz | xxxxx | ichiro.jpg | 2012/6/1 1:23:45 | 1 |

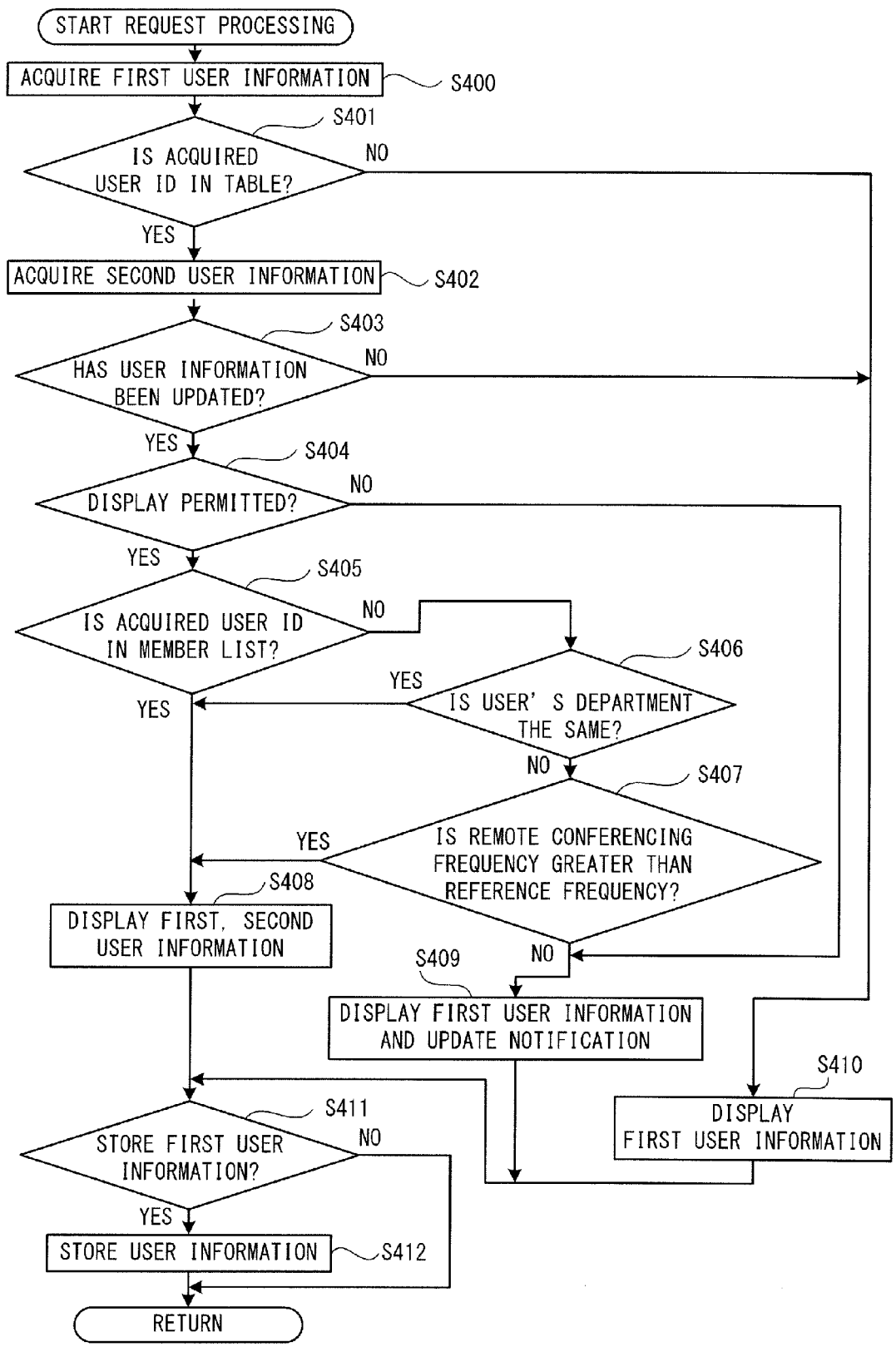

ered in the text.

NON-TRANSITORY COMPUTER-READABLE MEDIUM STORING PROGRAM AND COMMUNICATION DEVICE

CROSS-REFERENCE TO RELATED APPLICATION

This application claims priority to Japanese Patent Application Nos. 2012-165399 filed Jul. 26, 2012 and 2013-132045 filed on Jun. 24, 2013, the content of which is hereby incorporated herein by reference.

BACKGROUND

The present disclosure relates to a non-transitory computer readable medium storing a program that allows a communication device to make a request to another communication device for participation in a remote conference, and the communication device.

Systems that enable discussions among users in separate locations by transmitting and receiving video and audio among a plurality of communication devices have become widespread. Remote conferencing systems and the like are examples of these sorts of systems. Remote conferences include, for example, Web conferences, video conferences, video telephone calls, and the like. For example, a remote conferencing system is known in which an image of a user of another communication device who requests participation in a remote conference is displayed on the communication device that has received the request. The user of the communication device that has received the request can check the image of the user of the other communication device and can determine whether or not to permit participation in the remote conference that was requested by the user of the other communication device.

SUMMARY

In the known remote conferencing system that is described above, in a case where the image of the user of the other communication device has been changed, the changed image is displayed on the communication device that has received the request. In this case, an image that is different from the previous image is displayed on the communication device as the image of the user of the other communication device. Therefore, the user of the communication device that received the request may mistakenly believe that the request was received from a user who is different from the user of the other communication device. In this sort of case, the user who received the request may not grant permission to participate in the remote conference that was requested by the user of the other communication device, even in a case where permission to participate in the remote conference should be granted.

Embodiments of the broad principles derived herein provide a non-transitory computer readable medium storing a program that enables a communication device to make it possible for the user to appropriately determine whether or not to grant permission to participate in a remote conference, even in a case where an image of another user of another communication device has been changed, and the communication device.

Embodiments provide a non-transitory computer-readable medium storing computer-readable instructions that, when executed by a processor of a communication device, instruct the processor to perform a process including performing a first receiving that receives a start request from a partner communication device. The partner communication device is another communication device. The start request includes identification information and first user information and requests that a remote conference be started. The identification information identifies a user of the partner communication device. The first user information is user information that pertains to the user identified by the identification information. The computer-readable instructions further instruct the processor to perform a process including acquiring, based on the identification information, second user information stored in a storage portion. The second user information is user information that pertains to the user identified by the identification information included in the start request. The computer-readable instructions further instruct the processor to perform a process including performing a first determining that determines, based on a comparison of the first user information and the second user information, whether the first user information and the second user information differ from one another. The computer-readable instructions further instruct the processor to perform a process including performing a first outputting that outputs a first command in response to determining, in the first determining, that the first user information and the second user information differ from one another. The first command is a command to provide notification of the first user information and the second user information. The computer-readable instructions further instruct the processor to perform a process including performing a second outputting that outputs a second command in response to determining, in the first determining, that the first user information and the second user information do not differ from one another. The second command is a command to provide notification of one of the first user information and the second user information.

Embodiments also provide a non-transitory computer-readable medium storing computer-readable instructions that, when executed by a processor of a communication device, instruct the processor to perform a process including receiving a start request from a server. The start request includes identification information and first user information and requests that a remote conference be started. The identification information identifies a user of a partner communication device. The first user information is user information that pertains to the user identified by the identification information. The computer-readable instructions further instruct the processor to perform a process including determining, based on the identification information included in the start request, whether second user information is stored in a storage portion of the communication device. The second user information is user information that pertains to the user identified by the identification information. The computer-readable instructions further instruct the processor to perform a process including acquiring the second user information from the storage portion in response to determining that the second user information is stored in the storage portion. The computer-readable instructions further instruct the processor to perform a process including outputting a display command to a display portion of the communication device in response to determining that the second user information is stored in the storage portion. The display command is a command to display the first user information and the second user information.

Embodiments further provide a communication device that includes a processor and a memory. The memory stores computer-readable instructions. The computer-readable instructions cause the processor to perform a process including receiving a start request from a partner communication device. The start request includes identification information and first user information and requests that a remote conference be started. The identification information identifies a user of the partner communication device. The first user information is user information that pertains to the user identified by the identification information. The computer-readable instructions further cause the processor to perform a process including acquiring, based on the identification information, second user information that is stored in a storage portion of the communication device. The second user information is user information that pertains to the user identified by the identification information included in the start request. The computer-readable instructions further cause the processor to perform a process including determining, based on a comparison of the first user information and the second user information, whether the first user information and the second user information differ from one another. The computer-readable instructions further cause the processor to perform a process including outputting a first command to a display portion of the communication device in response to determining that the first user information and the second user information differ from one another. The first command is a command to display the first user information and the second user information. The computer-readable instructions further cause the processor to perform a process including outputting a second command to the display portion in response to determining that the first user information and the second user information do not differ from one another. The second command is a command to display one of the first user information and the second user information.

BRIEF DESCRIPTION OF THE DRAWINGS

Embodiments will be described below in detail with reference to the accompanying drawings in which:

FIG. 2 is a figure that shows an example of a table;

FIG. 7 is a flowchart of start request processing that is performed by the main processing in FIG. 6.

DETAILED DESCRIPTION

Figure 1:
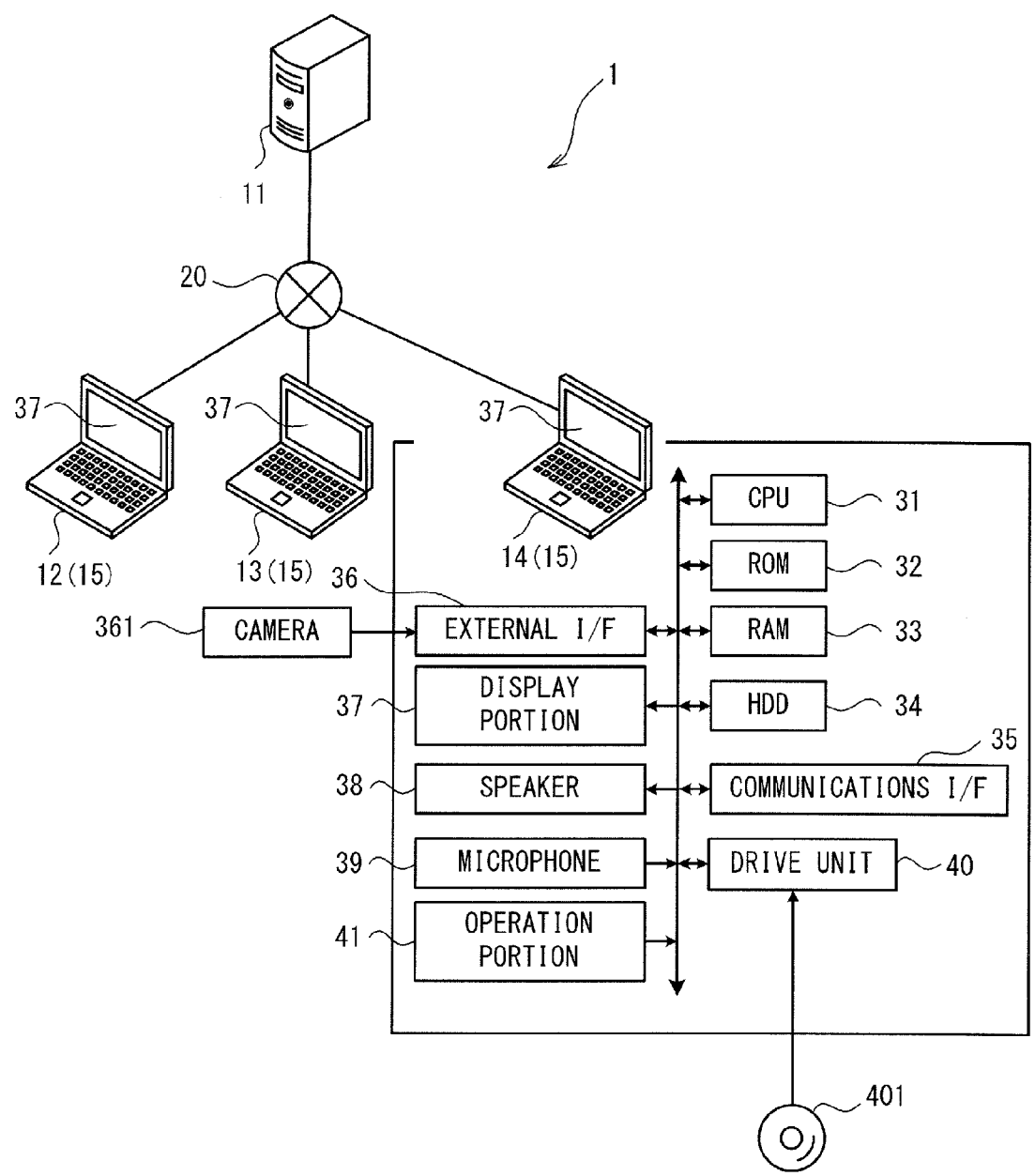
FIG. 1 is a figure that shows an overview a communication system and an electrical configuration of a communication device.

A communication system 1 will be explained with reference to FIG. 1. The communication system 1 includes a server 11 and communication devices 12, 13, 14 (hereinafter also collectively referred to as the communication devices 15). The server 11 and the communication device 15 are connected such that the server 11 and the communication device 15 can communicate with one another through a network 20 by using a specified protocol, such as the Hyper Text Transfer Protocol (HTTP) or the Session Initiation Protocol (SIP), for example. In a case where the communication device 15 is connected to the server 11, connection information that indicates that the communication device 15 is connected to the server 11 is stored in a storage portion of at least one of the server 11 and the communication device 15. The connection information may include, for example, user identification information (a user ID), a password, identification information (a session ID) that the server 11 assigns to the connection, and the like. The connection information makes it possible for a sustained connection between the communication device 15 and the server 11 to be established. A series of communications that are performed through the sustained connection is hereinafter referred to as a session.

In a case where a session is being conducted between the server 11 and the communication devices 12, 13, 14, the server 11 transmits to the communication devices 13, 14, at regular intervals, information that indicates that the communication device 12 is conducting the session with the server 11. Information that indicates that the communication devices 13, 14 are conducting the session with the server 11 is also transmitted in the same manner. Therefore, based on the information, the users of the communication devices 12, 13, 14 can know which of the communication devices 12, 13, 14 are maintaining the session with the server 11. The processing that is performed by the communication devices 12, 13, 14 may be processing that is performed by an application that is known as a presence client, for example. With the communication system 1, a remote conference can be conducted in which it is possible for a discussion to be carried out among the users of the communication devices 15 by the transmitting and receiving of video and audio among a plurality of the communication devices 15, through the server 11. At the time when the remote conference starts, each of the communication devices 15 transmits to the server 11 a conference connection request that requests a connection to a conference room. The conference connection request includes a user ID that identifies the user who is using the communication device 15 and a conference ID that specifies the conference room. The conference connection request is made by communication in accordance with a specified protocol, such as HTTP or the like, for example. The conference ID may be a specific Uniform Resource Locator (URL), for example. After the server 11 has received the conference connection request from the communication device 15, media data such as video data, audio data, and the like are transmitted and received between the server 11 and the communication device 15. Specifically, media data that have been acquired by a camera and a microphone that is connected to the communication device 15 are transmitted to the server 11 together with the user ID and the conference ID. The media data that the server 11 has received from the communication device 15 are transmitted to the other communication devices 15 that are connected to the conference room that is indicated by the same conference ID. In other words, the plurality of the communication devices 15 that are connected to the conference room that is indicated by the same conference ID conduct the remote conference by transmitting and receiving the media data through the server 11. The remote conference is started in a case where one of the communication devices 15 has received a start request from another one of the communication devices 15 and the start request has been accepted. The start request is a request to start the remote conference. A specific example of the communication device 15 may be a known personal computer (PC). The configuration of the communication system 1 can be modified. For example, the communication system 1 includes only the communication devices 15. Each one of the communication devices 15 may perform direct communication with another one of communication devices 15.

An electrical configuration of the communication device 15 will be explained. The communication device 15 includes a CPU 31 that performs control of the communication device 15. The CPU 31 is electrically connected to a ROM 32, a RAM 33, an HDD 34, a communications interface (I/F) 35, and an external interface (I/F) 36. A display portion 37, a speaker 38, a microphone 39, a drive unit 40, and an operation portion 41 that are installed in the communication device 15 are also electrically connected to the CPU 31 in the same manner. The display portion 37 may be a display itself, e.g., a Liquid Crystal Display (LCD), or may include a display itself and some interface hardware and/or software between the display itself and an application program. The ROM 32 stores a boot program, a BIOS, and the like. The RAM 33 stores a timer, a counter, and temporary data. The HDD 34 stores programs for causing the CPU 31 to perform main processing (refer to FIG. 6) and start request processing (refer to FIG. 7). The HDD 34 also stores a table 341 (described below; refer to FIG. 2). The communications I/F 35 may perform communication with the server 11 and another communication device 15 through the network 20. A camera 361 may be connected to the external I/F 36. The drive unit 40 may read information that is stored in a storage medium 401. For example, when the communication device 15 is set up, a program that is stored in the storage medium 401 may be read by the drive unit 40 and stored in the HDD 34. The communication device 15 may receive a program from the server 11 or another server through the network 20 and store the program in the HDD 34. In that case, the program may be stored in a storage medium such as an HDD or the like that is included in a server that is connected to the communication device 15 through the network 20. The operation portion 41 may accept an input from the user. The operation portion 41 may be a keyboard, for example. The operation portion 41 may be a mouse that is connected to an external I/F. In a case where the communication device 15 is a tablet-type terminal or a smart phone, the operation portion 41 may be a touch panel that is superposed on the display portion 37.

The table 341 will be explained with reference to FIG. 2. Information (hereinafter referred to as the user information) that pertains to another user who is using the other communication device 15 is stored in the table 341 in association with the user IDs. The user information may include, for example, a nickname, a self-introduction, the user's department, a user image, an update date and time, and a number of conferences. These user information items are merely examples. The user information may include one or more of the items. The user information may also include items other than the items listed above. The user ID is identification information that identifies the other user. The nickname is a different name for the other user. The self-introduction includes information that indicates the background or personal history of the other user. The user's department includes information that indicates the other user's affiliation. The user image is an image that shows the other user. The update date and time indicates the date and time of the most recent update to one of the user information items (one of the nickname, the self-introduction, the user's department, and the user image). The update date and time in the table 341 is information that is included in advance in the user information that is received from the server 11. The number of conferences is the number of times that the communication device 15 has participated in a remote conference with the other communication device 15 that is used by the other user.

In the present embodiment, it is assumed that the user always uses a specific communication device 15. The user ID may be associated with the identification information that identifies the communication device 15, and the user ID may also be used as the identification information that identifies the communication device 15. The identification information that identifies the communication device 15 may be transmitted from the communication device 15 to the server 11 in advance, and may be stored in the storage portion of the server 11.

The user information for the user of each one of the communication devices 15 may be edited by the user who uses that communication device 15. At Step S11 in the main processing (FIG. 6), which will be described below, the edited user information is transmitted from the communication device 15 to the server 11 together with the user ID (hereinafter also referred to as the communication device 15 user ID) of the user of the communication device 15. The server 11 stores the received user information in a storage portion (not shown in the drawings) of the server 11, in association with the user ID. When the user information is received, the server 11, using a clock function that is provided by the operating system (OS) of the server 11, acquires the time, then stores that time as the update date and time in the storage portion of the server 11, in association with the user ID. The server 11 may receive, from the communication device 12, for example, the start request that is the request to start the remote conference. The user ID (hereinafter also referred to as the communication device 12 user ID) of the user of the communication device 12, the conference ID of the remote conference, and the user ID (hereinafter also referred to as the communication device 13 user ID) of the user of the communication device 13, which is the destination for the transmission, may be included in the start request that has been received from the communication device 12, along with flag information. The flag information indicates whether or not inclusion in a display image of the user information before the change (editing) is permitted. Based on the communication device 12 user ID that is included in the start request that was received, the server 11 may acquire from the storage portion of the server 11 the user information that corresponds to the communication device 12 user ID. The server 11 may incorporate into the start request the communication device 12 user ID, the conference ID, the user information that corresponds to the communication device 12 user ID, and the flag information, then may transmit the start request to the communication device 13.

The user information may be stored in the HDD 34 of the communication device 15. The communication device 15 may create the start request that includes the communication device 15 user ID, the conference ID, the user information that is stored in the HDD 34, and the user ID (hereinafter also referred to as the other communication device 15 user ID) of the user of the other communication device 15, and may transmit the start request to the other communication device 15 through the server 11.

In a case where the CPU 31 has received the start request from the other communication device 15 through the server 11, the CPU 31 then displays, on the display portion 37 (refer to FIG. 1), a display image (for example, one of display images 371 to 373 (described below; refer to FIGS. 3 to 5)) that includes at least one of the user information items that are included in the start request. In a state in which a session is already being conducted with the server 11, the display image is displayed in a case where a start request is received through the server 11 from the other communication device 15.

Figure 3:
FIG. 3 is a figure that shows a first example of a display image.

FIG. 3 shows a first example (the display image 371) of the display image that is displayed on the display portion 37. The display image 371 includes a user image 3711, text 3712, and selection buttons 3713. The user image 3711 is the user image (taro.jpg or the like) that is included in the user information. The text 3712 provides notification that indicates that a request to participate in a video conference has been received. The text 3712 includes the nickname "TARO" that is included in the user information. The selection buttons 3713 are buttons that enable the user to select whether or not to start a remote conference in response to the start request from the other communication device 15. The selection buttons 3713 include an Accept button and a Refuse button. The user image that is included in the user information may be image data itself. The user image included in the user information may be address information for image data that are stored in the storage portion of the server 11.

By checking the user image 3711 and the nickname that are included in the display image 371, the user of the communication device 15 who is looking at the display image 371 determines whether or not to accept the start request to participate in a remote conference that uses the conference room and that has been requested by the other user who is using the other communication device 15. In a case where the user accepts the start request to participate in the remote conference, the user may select the Accept button of the selection buttons 3713. In that case, by transmitting to the server 11 a conference connection request that includes the conference ID and the communication device 15 user ID, the communication device 15 starts the remote conference that uses the conference room that corresponds to the conference ID. The communication device 15 transmits to the server 11 video data that have been captured by the camera 361 that is connected to the communication device 15 and audio data that have been collected by the microphone 39. From the server 11, the communication device 15 receives video data and audio data that have been transmitted from the other communication device 15. In contrast, in a case where the user refuses the start request for the remote conference that uses the conference room and that has been requested by the other user, the user may select the Refuse button of the selection buttons 3713. In that case, the communication device 15 does not transmit the conference connection request to the server 11.

As described above, the user can recognize the other user by checking the user information (the user image 3711 and the nickname) that is included in the display image 371. Therefore, the user can determine appropriately whether or not to accept the start request to participate in the remote conference that uses the conference room and that was requested by the other user.

In a case where the user information for the other user who uses the other communication device 15 has been changed, for example, one of a second example (the display image 372; refer to FIG. 4) and a third example (the display image 373; refer to FIG. 5) of the display image may be displayed on the display portion 37.

Figure 4:
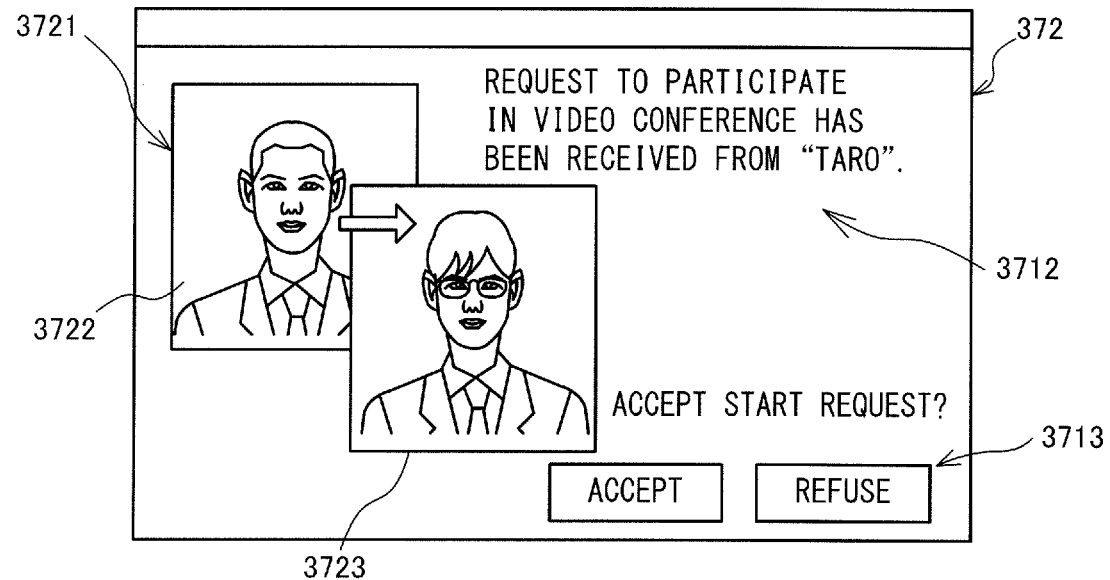
FIG. 4 is a figure that shows a second example of a display image.

FIG. 4 shows the second example (the display image 372) of the display image. The display image 372 is an example of the display image that is displayed in a case where the user image in the user information has been changed. The display image 372 differs from the display image 371 (refer to FIG. 3) in that the user image 3711 (refer to FIG. 3) has been changed to a user image 3721. The text 3712 and the selection buttons 3713 are the same as in the display image 371. The user image 3721 includes a user image 3722 before the change and a user image 3723 after the change. An arrow that points from the user image 3722 to the user image 3723 is also displayed. The user image 3721 shows that the user image in the user information for the user of the other communication device 15 has been changed from the user image 3722 to the user image 3723.

The user who looks at the display image 372 can check the user image 3723 after the change in association with the user image 3722 before the change. Therefore, even in a case where the user image for the other user has been changed, the user can confirm that the user image 3723 after the change is a user image that is associated with the other user, who is shown in the user image 3722 before the change. The user who received the start request for the remote conference that uses the conference room and that has been requested by the other user can determine appropriately whether or not to accept the start request to participate in the remote conference. Therefore, it is possible to prevent the user from refusing the start request for the remote conference by mistake when the user should participate in the remote conference.

Figure 5:
FIG. 5 is a figure that shows a third example of a display image.

FIG. 5 shows the third example (the display image 373) of the display image. The display image 373 is an example of the display image that is displayed in a case where the nickname in the user information has been changed. The display image 373 differs from the display image 371 (refer to FIG. 3) in that the text 3712 (refer to FIG. 3) has been changed to a text 3732. The user image 3711 and the selection buttons 3713 are the same as in the display image 371. The text 3732 includes the nickname "TARO" before the change and a nickname "T.K." after the change. An arrow that points from the nickname "TARO" to the nickname "T.K." is also displayed. The nickname "TARO" is crossed out by two horizontal lines. The text 3732 shows that the nickname in the user information for the other user has been changed from "TARO" to "T.K."

The user who looks at the display image 373 can check the nickname "T.K." after the change in association with the nickname "TARO" before the change. Therefore, even in a case where the nickname for the other user has been changed to "T.K.", the user can confirm that the nickname "T.K." after the change is a nickname that is associated with the other user, who is specified by the nickname "TARO" before the change. Thus the user can determine appropriately whether or not to accept the start request to participate in the remote conference. Therefore, it is possible to prevent the user from refusing the start request for the remote conference by mistake when the user should participate in the remote conference.

The form of the display image may be changed. For example, in the display image 372, it is acceptable for the user image 3722 and the user image 3723 not to be displayed on the display portion 37 at the same time. To take a specific example, it is acceptable for only the user image 3722 before the change to be included in the display image 372 at the time when the display of the display image 372 on the display portion 37 is started. The user image 3722 before the change may then be gradually changed into the user image 3723 after the change.

The user information that is included in the display image may be changed. For example, it is acceptable for the user image and the nickname not to be included in the display image. At least one of the user image, the nickname, the self-introduction, the user's department, and the number of conferences may be included as the user information in the display image. Another item in the user information may be included in the display image.

The main processing will be explained with reference to FIG. 6. In a state in which the power supply to the communication device 15 has been turned on and the communication device 15 has been connected to the network 20, the CPU 31 starts the main processing by reading and executing a program that is stored in the HDD 34 of the communication device 15. The main processing is not limited to the example in which the main processing is performed by the CPU 31. The main processing may be performed by another electronic component (for example, Application Specific Integrated Circuits (ASIC)). The main processing may be performed by distributed processing by a plurality of electronic devices (that is, a plurality of CPUs). A portion of the main processing may be performed by the server 11, which is connected to the communication device 15 through the network 20.

At Step S1, the CPU 31 connects to the server 11 via the communication I/F 35. For example, the CPU 31 may transmit, to the server 11 via the communication I/F 35, a connection request that includes at least one of the user ID and the password. The server 11 determines whether the user ID and the password that are included in the connection request from the communication device 15 are included in a user management table (not shown in the drawings) that is stored in the storage portion of the server 11. In a case where the user ID and the password are included in the user management table, the server 11 stores the connection information that corresponds to the user ID in the storage portion of the server 11. After storing the connection information, the server 11 transmits the user information that corresponds to the user ID to the communication device 15. The CPU 31 stores, in the RAM 33, the user information that has been received from the server 11 via the communication I/F 35. The user information may be transmitted from the communication device 15 to the server 11 in advance and may be stored in the storage portion of the server 11 in association with the user ID.

At Step S2, the CPU 31 receives, via the communication I/F 35, a member list that has been transmitted from the server 11. The member list is stored in the storage portion of the server 11 and includes a user ID for another user of at least one other communication device 15, in association with the user ID of the user of the communication device 15 in which the CPU 31 resides. Before Step S2 is executed, the server 11, based on the at least one of the user IDs for the other users that is included in the member list, searches for the connection information for the individual user IDs that are included in the member list. The server 11 then transmits to the communication device 15 the at least one of the user IDs for the other users that is included in the member list as well as the connection information for each of the user IDs in the member list. The CPU 31 stores, in the RAM, the received member list that has been received from the server 11 via the communication I/F 35. Then the CPU 31 outputs to the display portion 37 a command to display the member list that has been received from the server 11 via the communication I/F 35 as well as the connection information for each of the user IDs. By looking at the display content on the display portion 37, the user of the communication device 15 can determine whether or not the users who correspond to the user IDs that are included in the member list are connected to the server 11. The member list may be transmitted from the communication device 15 in advance and may be stored in the storage portion of the server 11.

At Step S3, the CPU 31 determines whether a start request has been received from the server 11 via the communication I/F 35. In a case where the CPU 31 has received the start request from the server 11 via the communication I/F 35 (YES at Step S3), the CPU 31 stores the start request in the RAM 33, and the processing advances to Step S4. In contrast, in a case where the CPU 31 has not received the start request from the server 11 via the communication I/F 35 (NO at Step S3), the processing advances to Step S8.

At Step S4, the CPU 31 performs the start request processing, which is shown in FIG. 7. The start request processing will be described in detail below. After the processing at Step S4 has been completed, the CPU 31 advances the processing to Step S5.

At Step S5, the CPU 31 determines whether the start request that was received from the server 11 at Step S3 has been accepted. For example, in a case where an input to the Accept button of the selection buttons 3713 in the display image that is displayed on the display portion 37 in accordance with the processing that is performed at one of Steps S408, S409, and S410 in FIG. 7 has been acquired from the operation portion 41 (YES at Step S5), the CPU 31 advances the processing to Step S6. In contrast, in a case where an input to the Accept button of the selection buttons 3713 has not been acquired from the operation portion 41, and an input to the Refuse button of the selection buttons 3713 has been acquired from the operation portion 41 (NO at Step S5), the CPU 31 returns the processing to Step S2.

At Step S6, the CPU 31 starts the remote conference by launching a conference application that is stored in the HDD 34. In launching the conference application, the CPU 31 defines the conference ID that is included in the start request that was received at Step S3 as a parameter for the conference application. The CPU 31 starts the remote conference by executing the conference application to transmit to the server 11 a conference connection request that includes the conference ID and the communication device 15 user ID. The CPU 31 then advances the processing to Step S7.

At Step S7, the CPU 31 adds "1" to the number of conferences that corresponds to the user ID of the user of the other communication device 15 that is the source of the start request. For example, the CPU 31 may search the table 341 that is stored in the HDD 34, using as a search key the other communication device 15 user ID that is included in the start request that was received via the communication I/F 35 at Step S3. The CPU 31 then may add "1" to the numerical value of the number of conferences that is stored, among the items that are included in the table 341, in association with the other communication device 15 user ID. Then the CPU 31 returns the processing to Step S2.

In a case where, at Step S3, the start request has not been received from the server 11 (NO at Step S3), the CPU 31 determines at Step S8 whether the CPU 31 has acquired from the operation portion 41 a command to transmit a start request. For example, the CPU 31 may acquire from the operation portion 41 a command to select, from the member list that is being displayed on the display portion 37 at Step S2, by the user of the communication device 15, a user ID of a user of another communication device 15 that is connected to the server 11. At this time, the CPU 31 may also acquire from the operation portion 41 a command to one of approve and reject inclusion in the display image of the user information before the change. In that case, the CPU 31 determines that the CPU 31 has acquired from the operation portion 41 the command to transmit the start request (YES at Step S8), and the processing advances to Step S9. In contrast, in a case where the CPU 31 has determined that the CPU 31 has not acquired from the operation portion 41 the command to transmit the start request (NO at Step S8), the processing advances to Step S10. The command to transmit the start request is not limited to being a command to select from the member list. For example, the other communication device 15 user ID may be input directly from the operation portion 41. In that case, the CPU 31 may transmit, to the server 11 via the communication I/F 35, the other communication device 15 user ID that was acquired from the operation portion 41. In a case where the user ID that the server 11 has received is included in the user management table that is stored in the storage portion of the server 11, the server 11 may transmit back to the communication device 15 the other communication device 15 user ID and the connection information that corresponds to the other communication device 15 user ID. The user of the communication device 15 may then check display content that is based on the other communication 15 user ID and the connection information that have been transmitted back to the communication device 15 from the server 11 via the communication I/F 35, and may input to the operation portion 41 a command to transmit a start request. In that case, the CPU 31 may determine that the CPU 31 has acquired from the operation portion 41 the command to transmit the start request.

At Step S9, the CPU 31 transmits the start request to the server 11 via the communication I/F 35, including in the start request the communication device 15 user ID, the conference ID for the remote conference, the user ID of the user of the other communication device 15 that has been selected, and the flag information that indicates whether or not the inclusion in the display image of the user information before the change is permitted. As described above, the server 11 transmits the start request to the other communication device 15, including in the start request the user ID of the user of the communication device 15 that issued the start request, the conference ID, and the user information that corresponds to the user ID of the user of the communication device 15 that issued the start request. After transmitting the start request to the server 11, the CPU 31 returns the processing to Step S2.

In a case where, at Step S8, the command to transmit the start request has not been acquired (NO at Step S8), the CPU 31 determines, at Step S10, whether the user information has been updated. For example, in a case where a command to change to the user information has been acquired from the operation portion 41, the CPU 31 determines that the user information has been updated. The command to change to the user information may be issued by using the operation portion 41 to make an input on a user information edit screen, for example. In a case where it is determined that the user information has been updated (YES at Step S10), the CPU 31 updates the user information that the CPU 31 received at Step S1 and stored in the RAM 33, and the processing advances to Step S11. In contrast, in a case where it is determined that the user information has not been updated (NO at Step S10), the CPU 31 advances the processing to Step S12.

At Step S11, the CPU 31 transmits, to the server 11 via the communication I/F 35, the user information item, based on the input to the user information edit screen via the operation portion 41 at Step S10, and the communication device 15 user ID. The server 11 updates the user information that corresponds to the received user ID. The server 11 updates the update date and time in the user information that corresponds to the received user ID, updating the update date and time to the time when the server 11 received the user information in response to the processing at Step S11. For example, in a case where the nickname has been changed at Step S10, the changed nickname and the communication device 15 user ID are transmitted to the server 11 via the communication I/F 35 at Step S11. In a case where the user image has been changed at Step S10, the image data that correspond to the changed user image and the communication device 15 user ID are transmitted to the server 11 via the communication I/F 35 at Step S11. After transmitting the user information, the CPU 31 returns the processing to Step S2.

In a case where, at Step S10, the user information has not been updated (NO at Step S10), the CPU 31 determines, at Step S12, whether the member list has been updated. The determination as to whether the member list has been updated is made based on an input that is acquired from the operation portion 41. For example, in a case where the CPU 31 has acquired via the operation portion 41 a command to delete a user ID of a user of another communication device 15 from the member list that was output to the display portion 37 at Step S2, the CPU 31 determines that the member list has been updated. To take another example, in a case where a user ID of a user of another communication device 15 has been input directly from the operation portion 41 to be added to the member list, the CPU 31 transmits the input user ID of the user of the other communication device 15 to the server 11 via the communication I/F 35. In a case where the received other communication device 15 user ID is included in the user management table that is stored in the storage portion of the server 11, the server 11 transmits back to the communication device 15 the other communication device 15 user ID, along with the connection information that corresponds to the other communication device 15 user ID. The user of the communication device 15 then may check the display content that is based on the user ID and the connection information that have been received from the server 11 via the communication I/F 35, and may input to the operation portion 41 a command to register the member list. In that case, the CPU 31 may determine that the member list has been updated. In a case where it is determined that the member list has been updated (YES at Step S12), the CPU 31 advances the processing to Step S13. In contrast, in a case where it is determined that the member list has not been updated (NO at Step S12), the CPU 31 advances the processing to Step S14.

At Step S13, the CPU 31, based on the input that was acquired via the operation portion 41 at Step S12, transmits a member list update request to the server 11 via the communication I/F 35. The member list update request includes the other communication device 15 user ID, input content information, and the user ID of the user of the communication device 15 that is transmitting the request. The input content information is information that indicates whether the other communication device 15 user ID is to be deleted from the member list or added to the member list. The server 11 updates the member list that corresponds to the received user ID of the user of the communication device 15 that transmitted the member list update request. After transmitting the member list update request, the CPU 31 returns the processing to Step S2.

In a case where, at Step S12, the member list has not been updated (NO at Step S12), the CPU 31, at Step S14, based on an input that has been acquired from the operation portion 41, determines whether a terminate command has been input. For example, in a case where an input to terminate the main processing has been made via the operation portion 41, the CPU 31 determines that the terminate command has been input. In a case where it is determined that the terminate command has been input (YES at Step S14), the CPU 31 advances the processing to Step S15. In contrast, in a case where it is determined that the terminate command has not been input (NO at Step S14), the CPU 31 returns the processing to Step S2.

At Step S15, the CPU 31 disconnects from the server 11. For example, the CPU 31 may transmit a command to delete the connection information to the server 11 via the communication I/F 35, with the command includes the communication device 15 user ID. The server 11 may delete from the storage portion of the server 11 the connection information that corresponds to the received communication device 15 user ID. After deleting the connection information, the server 11 may transmit to the communication device 15 information that indicates that the session with the server 11 has been terminated. By receiving via the communication I/F 35 the information that indicates that the session with the server 11 has been terminated, the CPU 31 completes disconnection from the server 11. The CPU 31 then may terminate the main processing.

The start request processing that is performed at Step S4 of the main processing in FIG. 6 will be explained with reference to FIG. 7. At Step S400, the CPU 31 acquires, from the start request that is stored in the RAM 33, the user information (hereinafter referred to as the first user information) and the flag information that are included in the start request. The CPU 31 stores the first user information and the flag information that the CPU 31 has acquired in the RAM 33.

The CPU 31 determines whether the user ID (hereinafter referred to as the acquired user ID) that is included in the user information that was acquired at Step S400 is stored in the table 341 (Step S401). For example, the CPU 31 may search the user IDs in the table 341 that is stored in the HDD 34 to see if the acquired user ID is among the user IDs in the table 341. In a case where the acquired user ID is stored in the table 341 (YES at Step S401), the CPU 31 advances the processing to Step S402. In contrast, in a case where the acquired user ID is not stored in the table 341 (NO at Step S401), the CPU 31 advances the processing to Step S410.

At Step S402, the CPU 31 reads the user information that corresponds to the acquired user ID (hereinafter referred to as the second user information) from the table 341 that is stored in the HDD 34, then stores the second user information in the RAM 33. Then, the CPU 31 advances the processing to Step S403. The second user information is the user information that was included in the start request that was received from the server 11 at Step S3 in the main processing (refer to FIG. 6) during a session that was conducted in the past, and the second user information has been stored in the table 341 at Step S412, which will be described below.

At Step S403, the CPU 31 determines whether the first user information and the second user information differ from one another. A case where the first user information and the second user information differ from one another is a case where the first user information was updated after the second user information was stored in the table 341. The CPU 31 compares the update date and time for the first user information that was stored in the RAM 33 at Step S400 with the update date and time for the second user information that was stored in the RAM 33 at Step S402 (Step S403). In a case where the update dates and times match, the first user information is the same as the second user information. In that case, the CPU 31 determines that the first user information and the second user information do not differ from one another (NO at Step S403), the processing advances to Step S410.

In a case where the update date and time for the first user information is more recent than the update date and time for the second user information, the first user information has been updated more recently than the second user information. In this case, the CPU 31 determines whether, within the first user information, display user information that is included in the display image that is displayed on the display portion 37 has been updated. The display user information is information that includes at least one of the items in the user information, that is, at least one of the nickname, the self-introduction, the user's department, and the user image, for example. The CPU 31 determines which of the items have been updated by taking the display user information from the first user information and the display user information from the second user information and comparing the two.

For example, in a case where one of the display image 372 (refer to FIG. 4) and the display image 373 (refer to FIG. 5) is displayed, the display user information includes the user image and the nickname. The user image and the nickname that are included in the first user information are compared to the user image and the nickname that are included in the second user information. Specifically, in a case where the user images are compared, for example, the CPU 31 may determine whether the user image has been updated by computing hash values for both of the user images and comparing the computed hash values. For example, in a case where the nicknames are compared, the determination as to whether the nickname has been updated may be made by comparing the code information (ASCII code or the like) for the individual characters of the nicknames. In a case where both the user images and the nicknames match, it may be determined that the display user information has not been updated. In a case where a difference is found at least one of between the two user images and between the two nicknames, it may be determined that the display user information has been updated. In a case where it is determined that the display user information has not been updated, that is, that the first user information and the second user information do not differ from one another (NO at Step S403), the CPU 31 advances the processing to Step S410.

In contrast, in a case where it is determined that the display user information has been updated, that is, that the first user information and the second user information differ from one another (YES at Step S403), the CPU 31 determines whether the flag information that was acquired at Step S400 indicates that the inclusion in the display image of the user information that is included in the second user information (that is, the user information before the update) is permitted (Step S404). The CPU 31 makes the determination by referencing the flag information that was stored in the RAM 33 at Step S400. In a case where the flag information that is stored in the RAM 33 does not permit the user information before the update to be included in the display image (NO at Step S404), the CPU 31 advances the processing to Step S409. In contrast, in a case where the flag information that is stored in the RAM 33 permits the user information before the update to be included in the display image (YES at Step S404), the CPU 31 advances the processing to Step S405.

Figure 6:
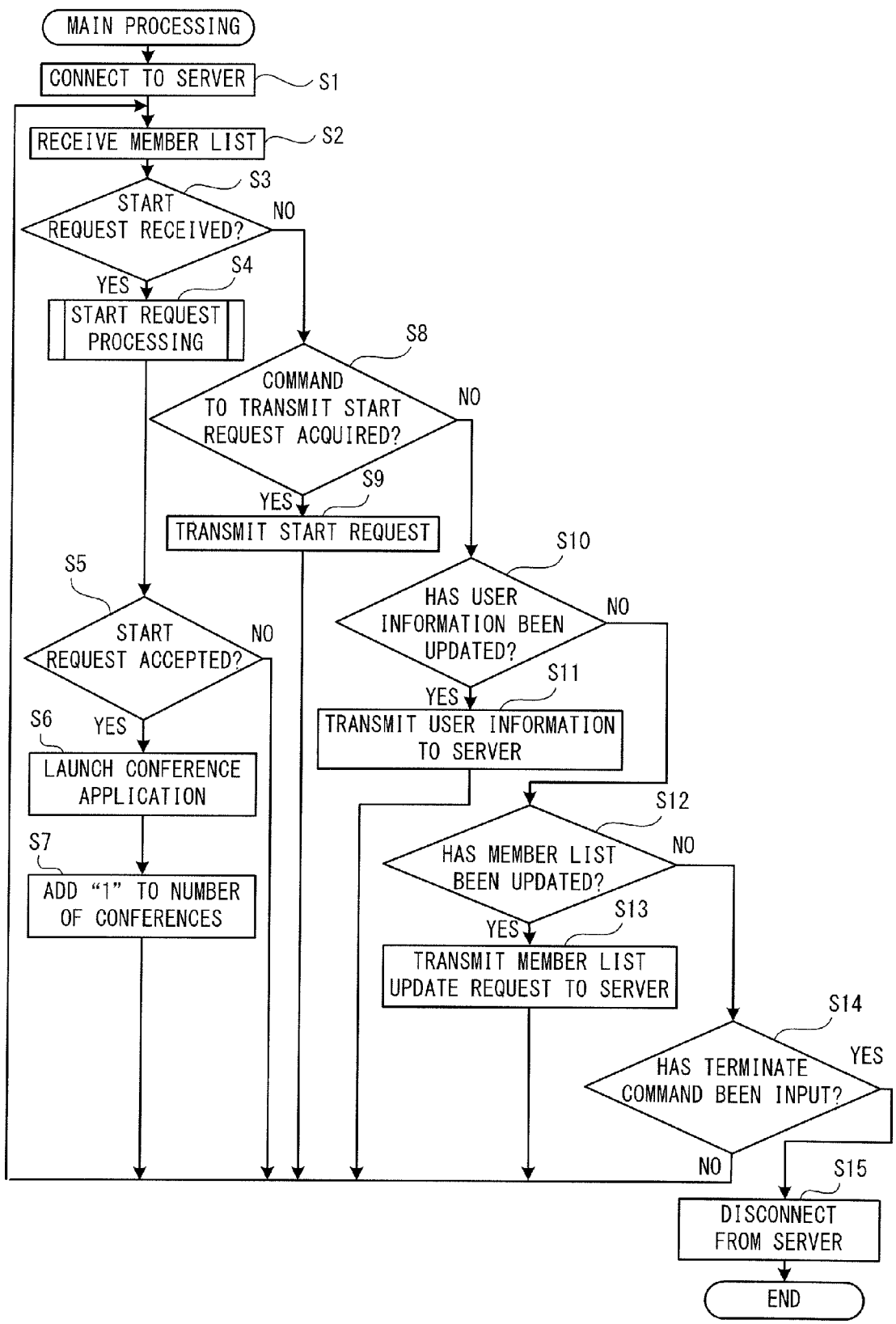
FIG. 6 is a flowchart of main processing.

At Step S405, the CPU 31 determines whether the acquired user ID that is included in the first user information is included in the member list that was acquired at Step S2 of the main processing that is shown in FIG. 6. For example, the CPU 31 may make the determination at Step S405 by comparing the acquired user ID that was acquired at Step S401 with the user IDs that are included in the member list that is stored in the RAM 33. In a case where the acquired user ID is included in the member list, it is conceivable that the user of the communication device 15 has frequently made contacts, including remote conferences, with the user who corresponds to the acquired user ID. In other words, in a case where the acquired user ID is included in the member list, it is conceivable that the user of the communication device 15 has frequently checked the second user information that corresponds to the acquired user ID. Therefore, presenting to the user of the communication device 15 the second user information that corresponds to the acquired user ID shows to the user of the communication device 15 that the second user information and the first user information correspond to the same acquired user ID, thereby increasing the convenience to the user. In a case where the acquired user ID that is included in the first user information is included in the member list (YES at Step S405), the CPU 31 advances the processing to Step S408. In contrast, in a case where the acquired user ID that is included in the first user information is not included in the member list (NO at Step S405), the CPU 31 advances the processing to Step S406.

At Step S408, the CPU 31 creates a display image (for example, one of the display image 372 and the display image 373) that includes the display user information (the display user information before the update) that is included in the second user information and the display user information (the updated display user information) that is included in the first user information. The CPU 31 transmits to the display portion 37 a command to display the created display image. Then the CPU 31 advances the processing to Step S411.

In a case where the determination at Step S405 is NO, the CPU 31, at Step S406, determines whether the user's department that is included in the second user information is the same as the user's department that is included in the user information that corresponds to the communication device 15 user ID. For example, the CPU 31 may make the determination at Step S406 by comparing the user's department that is included in the second user information with the user's department that is included in the user information that corresponds to the communication device 15 user ID and that was stored in the RAM 33 at one of Steps S1 and S10 of the main processing that is shown in FIG. 6. In a case where the user's department that is included in the second user information is the same as the user's department that is included in the user information that corresponds to the communication device 15 user ID, it is conceivable that the user of the communication device 15 is directly acquainted with the user who corresponds to the acquired user ID. Therefore, presenting to the user of the communication device 15 the second user information that corresponds to the acquired user ID shows to the user of the communication device 15 that the second user information and the first user information correspond to the same acquired user ID, thereby increasing the convenience to the user. In a case where it is determined that the user's department that is included in the second user information is the same as the user's department that is included in the user information that corresponds to the communication device 15 user ID (YES at Step S406), the CPU 31 advances the processing to Step S408. In contrast, in a case where it is determined that the user's department that is included in the second user information is not the same as the user's department that is included in the user information that corresponds to the communication device 15 user ID (NO at Step S406), the CPU 31 advances the processing to Step S407.

In a case where the determination at Step S406 is NO, the CPU 31, at Step S407, determines whether the frequency with which remote conferences are held with the user of the other communication device 15 who corresponds to the acquired user ID is greater than a reference frequency. For example, in a case where the number of conferences that is included in the second user information is greater than a specified number (for example, 5), the CPU 31 may determine that the frequency with which remote conferences are held is greater than the reference frequency. In a case where the number of conferences is greater than the specified number, there is a strong possibility that the user of the communication device 15 may remember the user who corresponds to the acquired user ID. Therefore, presenting to the user of the communication device 15 the second user information that corresponds to the acquired user ID shows to the user of the communication device 15 that the second user information and the first user information correspond to the same acquired user ID, thereby increasing the convenience to the user. In a case where it is determined that the frequency of the remote conferences is greater than the reference frequency (YES at Step S407), the CPU 31 advances the processing to Step S408. In contrast, in a case where it is determined that the frequency of the remote conferences is not greater than the reference frequency (NO at Step S407), the CPU 31 advances the processing to Step S409. The reference frequency may be either one of a fixed value that is set in advance and a variable value that can be set by the user.

At Step S409, the CPU 31 creates a display image that includes the display user information (the updated display user information) that is included in the first user information and text information (for example, "User image has been updated" or the like) that indicates that the display user information has been updated. The CPU 31 transmits to the display portion 37 a command to display the created display image. Then the CPU 31 advances the processing to Step S411.

In a case where the determination at Step S401 is NO, as well as in a case where the determination at Step S403 is NO, the CPU 31 performs the processing at Step S410. At Step S410, the CPU 31 creates a display image (for example, the display image 371) that includes the display user information that is included in the first user information. The CPU 31 transmits to the display portion 37 a command to display the created display image. Then the CPU 31 advances the processing to Step S411.

In a case where the determination at Step S403 is NO, the CPU 31, at Step S410, may create and display on the display portion 37 a display image that includes the display user information that is included in the second user information, instead of the display user information that is included in the first user information. In this case, the first user information and the second user information are the same. Therefore, even in a case where a display image has been created that includes the display user information that is included in the second user information, instead of the display user information that is included in the first user information, the same display image is created and displayed on the display portion 37. In a case where the determination at Step S401 is NO, the second user information does not exist. In this case, at Step S410, the CPU 31 may create the display image that includes the display user information that is included in the first user information, as described above.

At Step S411, the CPU 31 determines whether to store the first user information in the table 341. For example, in a case where it was determined at Step S401 that the user information that corresponds to the acquired user ID is not stored in the table 341 (NO at Step S401), the CPU 31 determines to store the first user information in the table 341 (YES at S411). The CPU 31 also determines to store the first user information in the table 341 (YES at S411) in a case where it was determined at Step S403 that the update date and time for the first user information is more recent than the update date and time for the second user information (YES at Step S403). In contrast, in a case where it was determined at Step S401 that the user information that corresponds to the acquired user ID is stored in the table 341 (YES at Step S401), and it was determined at Step S403 that the display user information has not been updated (NO at Step S403), the CPU 31 determines not to store the first user information in the table 341 (NO at S411). In this case, the second user information that is the same as the first user information has already been stored in the table 341, so there is no need to newly store the first user information in the table 341. In a case where the CPU 31 has determined to store the first user information in the table 341 (YES at S411), the CPU 31 advances the processing to Step S412. In contrast, in a case where the CPU 31 has determined not to store the first user information in the table 341 (NO at S411), the CPU 31 terminates the start request processing and advances the processing to Step S5 of the main processing that is shown in FIG. 6.

At Step S412, the CPU 31 stores the first user information in the table 341 in association with the acquired user ID. In a case where the user information that corresponds to the acquired user ID has already been stored in the table 341, the CPU 31 uses the first user information to update the user information that corresponds to the acquired user ID. Then the CPU 31 terminates the start request processing and advances the processing to Step S5 of the main processing that is shown in FIG. 6.

As has been explained above, in a case where the second user information and the first user information differ from one another at the time when the communication device 15 starts the session, the determination is made that the user information has been updated. In that case, the communication device 15 can notify the user of the communication device 15, associating the first user information and the second user information with one another. The user of the communication device 15 can thus easily be made aware that the first user information is information that pertains to the other user who corresponds to the second user information. Therefore, the user can determine appropriately whether or not to start the session with the other communication device 15.

Furthermore, by displaying one of the display image 372 (refer to FIG. 4) and the display image 373 (refer to FIG. 5) on the display portion 37, for example, the communication device 15 can make the user aware of the first user information and the second user information at the same time. The communication device 15 can therefore more easily make the user aware that the first user information is information that indicates the other user who corresponds to the second user information.

By displaying the display image 372 (refer to FIG. 4), for example, on the display portion 37, the communication device 15 can make the user aware of the user image. The communication device 15 can therefore easily make the user aware, at a glance, that the first user information is information that indicates the other user who corresponds to the second user information.

The communication device 15 can store, as the second user information in the table 341, the first user information that is included in the start request that was received from the other communication device 15. Therefore, the communication device 15 can acquire the second user information appropriately and reliably by referencing the table 341.

Furthermore, by referencing the user ID of the user of the other communication device 15 that transmitted the start request, the communication device 15 can extract from the table 341 the second user information that is associated with the user ID. The communication device 15 can therefore acquire the second user information accurately.

Moreover, even in a case where the display user information has been updated (YES at Step S403), in a case where the flag information that does not permit the user information before the update to be included in the display image has been stored in the RAM 33 (NO at Step S404), the communication device 15 displays on the display portion 37 the display user information that is included in the first user information and the text information that indicates that the display user information has been updated (Step S409). The communication device 15 can thus to prevent the providing of the second user information to the user. Moreover, the communication device 15 can notify the user that the second user information has been updated, without providing the second user information itself.

The present disclosure is not limited to the embodiment that has been described above, and various types of modifications can be made. The table 341 may be stored in the server 11. The communication device 15 may store the user information in the table 341 by performing communication with the server 11. The communication device 15 may store the user information in the HDD 34. The user does not have to always use a specific communication device 15. The user may use any communication device 15.

The determination as to whether or not the second user information has been updated may be made by directly comparing the items that are included in the second user information (for example, the nickname, the self-introduction) right from the start, without referencing the update date and time.

The providing of the user information to the user is not limited to displaying on the display portion 37. For example, the communication device 15 may also provide the user information to the user by outputting to the speaker 38 audio that indicates the user information (for example, the nickname).

At Step S407 of the start request processing (refer to FIG. 7) in the embodiment that is described above, the number of conferences is used as an indicator of the frequency of the remote conferences. However, the length of time that has elapsed since the last remote conference that was conducted with the communication device 15 of the user who corresponds to the acquired user ID may be used as the indicator of the frequency of the remote conferences. In that case, the date and time of the last remote conference that was conducted with the communication device 15 of the user who corresponds to the acquired user ID may be stored in the table 341 instead of or in addition to the number of conferences. Then, at Step S7 of the main processing that is shown in FIG. 6, the time when the conference application was launched at Step S6 may be stored in the table 341 instead of or in addition to the adding of 1 to the number of conferences in the table 341.

In the start request processing that is shown in FIG. 7, it is acceptable for the processing of at least one of Steps S404, S405, S406, and S407 not to be performed.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A non-transitory computer-readable medium storing computer-readable instructions that, when executed by a processor of a communication device, instruct the processor to perform processes comprising:

performing a first receiving that receives a start request from a partner communication device, the partner communication device being another communication device, the start request including identification information and first user information and requesting that a remote conference be started, the identification information identifying a user of the partner communication device, and the first user information being user information that pertains to the user identified by the identification information;

acquiring, based on the identification information, second user information stored in a storage portion, the second user information being user information that pertains to the user identified by the identification information included in the start request;

performing a first determining that determines, based on a comparison of the first user information and the second user information, whether the first user information and the second user information differ from one another;

performing a first outputting that outputs a first command in response to determining, in the first determining, that the first user information and the second user information differ from one another, the first command being a command to provide notification of the first user information and the second user information; and performing a second outputting that outputs a second command in response to determining, in the first determining, that the first user information and the second user information do not differ from one another, the second command being a command to provide notification of one of the first user information and the second user information.

2. The non-transitory computer-readable medium according to claim 1, wherein
the first outputting comprises outputting a third command to a display portion of the communication device in response to determining, in the first determining, that the first user information and the second user information differ from one another, the third command being a command to display the first user information along with the second user information.

3. The non-transitory computer-readable medium according to claim 1, wherein
the acquiring comprises:
performing a second determining that determines, based on the identification information, whether the second user information is stored in the storage portion, the storage portion being included in the communication device; and
reading the second user information from the storage portion in response to determining, in the second determining, that the second user information is stored in the storage portion.

4. The non-transitory computer-readable medium according to claim 3, wherein the computer-readable instructions further instruct the processor to perform a process comprising:
storing the first user information, in association with the identification information, as the second user information in the storage portion, the first user information being included in the start request that was received in the first receiving.

5. The non-transitory computer-readable medium according to claim 3, wherein
the computer-readable instructions further instruct the processor to perform a process comprising:
performing a third determining that determines whether permission information is included in the start request that was received in the first receiving, the permission information indicating that displaying the second user information is permitted, and
the first outputting outputs a forth command without outputting a fifth command, in response to determining, in the second determining, that the second user information is stored in the storage portion and determining, in the third determining, that the permission information is not included in the start request, even in a case where it has been determined, in the first determining, that the first user information and the second user information differ from one another, the forth command being a command to provide notification of the first user information and update information, the update information being information that indicates that the first user information and the second user information differ from one another, and the fifth command being a command to provide notification of the second user information.

6. The non-transitory computer-readable medium according to claim 1, wherein
the computer-readable instructions further instruct the processor to perform processes comprising:
performing a second receiving that receives a member list, the member list including identification information that identifies a user of at least one other communication device; and
performing a fourth determining that determines whether the identification information that is included in the start request is included in the member list, wherein
the first outputting outputs the first command in response to determining, in the first determining, that the first user information and the second user information differ from one another and determining, in the fourth determining, that the identification information that is included in the start request is included in the member list, and wherein
the first outputting outputs a fourth command without outputting a fifth command, in response to determining, in the fourth determining, that the identification information that is included in the start request is not included in the member list, even in a case where it has been determined, in the first determining, that the first user information and the second user information differ from one another, the fourth command being a command to provide notification of the first user information and update information, the update information being information that indicates that the first user information and the second user information differ from one another, and the fifth command being a command to provide notification of the second user information.

7. The non-transitory computer-readable medium according to claim 1, wherein
the first receiving comprises receiving the start request that includes the first user information, the first user information further including affiliation information that indicates an affiliation of the user of the partner communication device,
the computer-readable instructions further instruct the processor to perform a process comprising:
performing a fifth determining that determines whether first affiliation information and second affiliation information match, the first affiliation information being affiliation information that is included in user information corresponding to identification information for a user of the communication device, and the second affiliation information being the affiliation information that is included in the first user information,
the first outputting outputs the first command in response to determining, in the first determining, that the first user information and the second user information differ from one another and determining, in the fifth determining, that the first affiliation information and the second affiliation information match, and
the first outputting outputs a fourth command without outputting a fifth command, in response to determining, in the fifth determining, that the first affiliation information and the second affiliation information do not match, even in a case where it has been determined, in the first determining, that the first user information and the second user information differ from one another, the fourth command being a command to provide notification of the first user information and update information, the update information being information that indicates that the first user information and the second user information differ from one another, and the fifth command being a command to provide notification of the second user information.

8. The non-transitory computer-readable medium according to claim 1, wherein
the first receiving comprises receiving the start request that includes the first user information, the first user information further including an indicator that indicates a frequency of remote conferencing, and
the computer-readable instructions further instruct the processor to perform a process comprising:
performing a sixth determining that determines whether the frequency that is indicated by the indicator included in the first user information is greater than a reference frequency,
the first outputting outputs the first command in response to determining, in the first determining, that the first user information and the second user information differ from one another and determining, in the sixth determining, that the frequency that is indicated by the indicator is greater than the reference frequency, and
the first outputting outputs a fourth command without outputting a fifth command, in response to determining, in the sixth determining, that the frequency that is indicated by the indicator is not greater than the reference frequency, even in a case where it has been determined, in the first determining, that the first user information and the second user information differ from one another, the fourth command being a command to provide notification of the first user information and update information, the update information being information that indicates that the first user information and the second user information differ from one another, and the fifth command being a command to provide notification of the second user information.

9. A non-transitory computer-readable medium storing computer-readable instructions that, when executed by a processor of a communication device, instruct the processor to perform processes comprising:
receiving a start request from a server, the start request including identification information and first user information and requesting that a remote conference be started, the identification information identifying a user of a partner communication device, and the first user information being user information that pertains to the user identified by the identification information;
determining, based on the identification information included in the start request, whether second user information is stored in a storage portion of the communication device, the second user information being user information that pertains to the user identified by the identification information;
acquiring the second user information from the storage portion in response to determining that the second user information is stored in the storage portion; and
outputting:
a first display command to a display portion of the communication device in response to determining that the second user information is stored in the storage portion, the first display command being a command to display the first user information and the second user information; and
a second display command to the display portion in response to determining that the second user information is not stored in the storage portion, the second display command being a command to display the first user information.

10. A communication device comprising:
a processor; and
a memory storing computer-readable instructions, wherein the computer-readable instructions cause the processor to perform processes comprising:
receiving a start request from a partner communication device, the start request including identification information and first user information and requesting that a remote conference be started, the identification information identifying a user of the partner communication device, and the first user information being user information that pertains to the user identified by the identification information;
acquiring, based on the identification information, second user information that is stored in a storage portion of the communication device, the second user information being user information that pertains to the user identified by the identification information included in the start request;
determining, based on a comparison of the first user information and the second user information, whether the first user information and the second user information differ from one another;
outputting a first command to a display portion of the communication device in response to determining that the first user information and the second user information differ from one another, the first command being a command to display the first user information and the second user information; and
outputting a second command to the display portion in response to determining that the first user information and the second user information do not differ from one another, the second command being a command to display one of the first user information and the second user information.

* * * * *